United States Patent [19]

Katagiri

[11] Patent Number: 5,097,952
[45] Date of Patent: Mar. 24, 1992

[54] CASE FOR CASSETTE

[75] Inventor: Shingo Katagiri, Kanagawa, Japan

[73] Assignee: Fuji Photo Film Co., Ltd., Kanagawa, Japan

[21] Appl. No.: 555,685

[22] Filed: Jul. 23, 1990

[30] Foreign Application Priority Data

Sep. 1, 1989 [JP] Japan ............................. 1-101847[U]
Sep. 14, 1989 [JP] Japan ............................. 1-107261[U]

[51] Int. Cl.$^5$ .......................................... B65D 85/575
[52] U.S. Cl. ................................... 206/387; 206/459; 264/328.8
[58] Field of Search ....................... 206/307, 387, 459; 264/328.8, 328.11

[56] References Cited

U.S. PATENT DOCUMENTS

| | | | |
|---|---|---|---|
| 3,747,745 | 7/1973 | Esashi et al. | 206/387 |
| 4,046,255 | 9/1977 | Ackeret | 206/387 |
| 4,253,567 | 3/1981 | Goldammer | 206/387 |
| 4,365,711 | 12/1982 | Long et al. | 206/387 |
| 4,627,534 | 12/1986 | Komiyama et al. | 206/387 |
| 4,648,507 | 3/1987 | Komiyama et al. | 206/387 |

FOREIGN PATENT DOCUMENTS 2513333 10/1976 Fed. Rep. of Germany ...... 206/387

Primary Examiner—Jimmy G. Foster
Attorney, Agent, or Firm—Sughrue, Mion, Zinn, Macpeak & Seas

[57] ABSTRACT

A magnetic tape cassette of reduced thickness which can be manufactured with high productivity. The cassette includes a lid having a pocket and a body, the latter having rotation-preventing projections formed integrally therewith, which are pivotally coupled to each other so as to open and close in the manner of a book. Recesses are provided in the lid and body in which the thick portion of the cassette is accommodated. Projections are provided on the bottom of the recess of at least the body of the case, which projections extend up from the bottom of the recess in the direction of thickness of the case. At least the tops of the projections are aventurine surfaces.

3 Claims, 5 Drawing Sheets

CASE FOR CASSETTE

BACKGROUND OF THE INVENTION

The present invention relates to a magnetic tape cassette case. More particularly, the invention relates to an improved magnetic tape cassette case in which a magnetic tape cassette for an audio machine or the like is stored.

When a magnetic tape cassette for an audio machine or the like is stored, the cassette is usually put in a magnetic tape cassette case made of plastic. The front portion of the cassette has an opening into which the magnetic head of the record/playback apparatus is inserted. A magnetic tape is provided in the cassette arranged so that the tape extends along the opening of the front portion of the cassette. The cassette case is used to prevent dust from entering the cassette through the front opening thereof and to protect the cassette and the magnetic tape at the opening.

FIG. 1 shows the basic constitution of a conventional cassette case 31. The case 31 includes a lid 32 having a pocket 34 into which a cassette 20 is inserted, and a body 35 having a pair of rotation-preventing projections 7 on which the shaft insertion holes 22 of the cassette are fitted. Pins projecting from the insides of the right and left portions of the body 35 are fitted in through-holes of the right and left portions of the lid 32 at the pocket 34 thereof so that the lid and the body are pivotally coupled to each other so that they can be opened and closed with respect to each other. Since the distance between the covering portions 33 and 36 of the case 31, which face the observe and reverse sides of the cassette 20, is set to correspond to the thickness of the thick part 21 of the cassette, the thickness $l_1$ of the case is made considerably larger than that $l_2$ of the other portion of the cassette. For this reason, it takes a considerably larger space to store the cassette 20 in the case 31 than to store the cassette without placing the cassette 20 in a case. As a result, if it is desired to store as large a number of the cassettes 20 as possible is stored in a limited space such as the interior of a motor vehicle, the cassettes are often intentionally not put in cases. However, if the cassette 20 is stored without being put in a case, dust is more likely to enter the cassette, promoting deterioration of the record/playback properties of the magnetic tape of the cassette.

The present applicant earlier proposed cassette cases of a smaller thickness, as disclosed in U.S. Pat. Nos. 4,648,507 and 4,627,534. Each of these cases has recesses in which the thick portion of a cassette is accommodated. For this purpose, the front opening of the cassette is located at the edges of the case which open and close, which is reverse to the conventional cassette case shown in FIG. 1.

The improved cassette case 11 disclosed in U.S. Pat. No. 4,627,534 will be described in more detail with reference to FIG. 2. In the case 11, a lid 12 having a pocket 14 and a body 15 are pivotally coupled to each other in the same manner as the cassette case shown in FIG. 1. The covering portion 13 of the lid 12 which faces the obverse or reverse side of the cassette has a recess 18a in which the thick portion 21 of the cassette, in which is formed the front opening of the cassette, is accommodated. Another recess 18b to accommodate the thick portion 21 of the cassette is formed in the covering portion 16 of the body 15 which faces the reverse or obverse side of the cassette. A pair of rotation-preventing projections 7 on which the reel shaft insertion holes 22 of the cassette are fitted are provided in the same manner as the cassette case shown in FIG. 1. The recesses 18a and 18b are provided in the inside of the case 11 facing each other. Each of the recesses 18a and 18b is shaped as a trapezoid, for example, diverging toward the opening and closing edges of the lid 12 and the body 15 to accommodate the thick portion 21 of the cassette. The right and left portions 19 of the body 15 and those of the lid 12 at the pocket 14 thereof have hollows and projections on the mutually facing sides of the portions so that when the lid and the body are closed relative to each other, the projections are fitted in the hollows to prevent the lid from unexpectedly opening while the cassette is stored in the case 11. When the lid 12 and the body 15 are in the closed position, the distance between the covering portions 13 and 16 of the lid and the body is just slightly larger than the thickness $l_2$ of the cassette 20 except for the thick portion 21 thereof, and the distance between the recesses 18a and 18b is just slightly larger than the thickness $l_5$ of the thick portion.

The thickness of the improved cassette case shown in FIG. 2 is thus made considerably smaller than that of the cassette case shown in FIG. 1, reducing the required storage space and improving the portability of the cassette and case. However, as shown in FIG. 3, when the reduced-thickness case 11 accommodating the cassette 20 is carried or transported, the thick portion 21 of the cassette is likely to come into contact with the case at the recesses 18a and 18b to make scratches in the case because the distance between the recesses is not much larger than the thickness $l_5$ of the thick portion. Particularly, during the formation of the scratches chipping dust is likely to be produced due to the mutual rubbing of the thick portion 21 of the cassette 20 and the case 11 at the peripheral portions 18c and 18d of the recesses 18a and 18b near the front wall 10 of the case. Such dust can enter the cassette through the front opening in the thick portion and cling to the surface of the magnetic tape in the cassette, causing dropout in recording on the tape.

These cassette cases are usually manufactured using an injection molding process. Since the recess 18a of the lid 12 having the pocket 14 is formed in the lid in the manner of an undercut portion as shown in FIG. 4, a slide core 103 movable in the direction of the thickness of the covering portion 13 of the lid 12 is required to form the recess. The lid 12 is molded through the use of three movable dies 101, 102 and 103 and a fixed die 100, which constitute a complicated die assembly. Since the slide core 103 for forming the recess 18a of the lid 12 is moved in such a direction as to expand the molding cavity defined by the dies and the movable die 102 corresponding to the inside surface of the pocket 14 of the lid is thereafter moved along the inside surface of the covering portion 13 of the lid, the molding process is lengthy, making the productivity for the case 11 lower than that for the cassette case 31 shown in FIG. 1. Moreover, frequent maintenance of the dies 100, 101, 102 and 103 is required because the constitution of the dies is complicated.

SUMMARY OF THE INVENTION

The present invention was made in order to solve the above-mentioned problem.

Accordingly, it is an object of the present invention to provide a cassette case improved in such a manner as to eliminate scratching as described above.

In the cassette case of the invention, a lid having a pocket and a body having rotation-preventing projections are pivotally coupled to each other so as to open and close relative to each other, and recesses in which the thick portion of a cassette is accommodated are provided in the lid and the body at the opening portions thereof. Projections are provided on the bottom of the recess of at least the body of the case extending up from the bottom of the recess in the direction of the thickness of the case, and at least the tops of the projections are aventurine surfaces.

It is another object of the present invention to provide a cassette case which can be manufactured with a high productivity and which is reduced in thickness.

DESCRIPTION OF THE PREFERRED EMBODIMENTS

Preferred embodiments of the present invention are hereafter described in detail with reference to the attached drawings. The present invention is not, however, confined to these specific embodiments.

Figure 5:
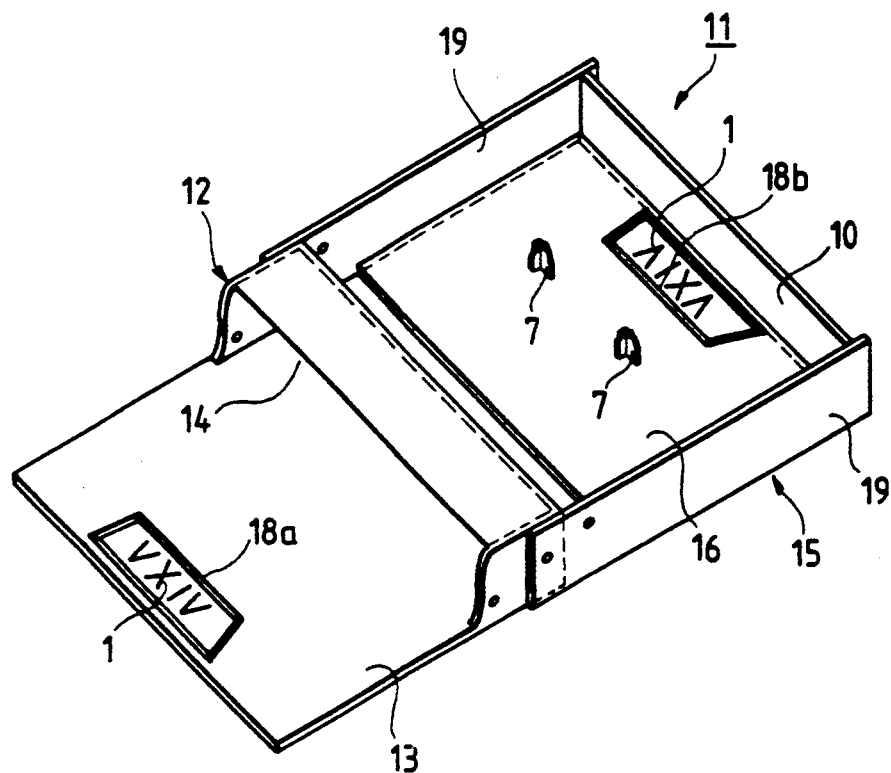
FIG. 5 is a perspective view of a cassette case constructed in accordance with a preferred embodiment of the present invention.
Figure 6:
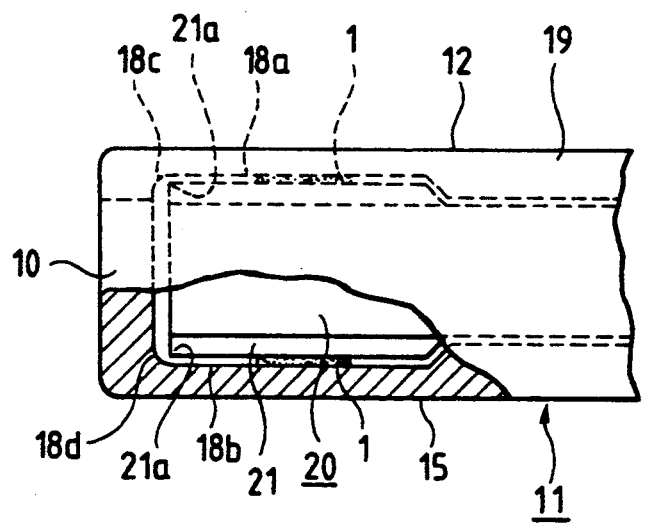
FIG. 6 is a partial sectional view of the cassette case shown in FIG. 5 and accommodating a cassette.

FIG. 5 is a perspective view of a cassette case 11 in such a state that a cassette can be inserted into the case. FIG. 6 is a side view of the cassette case 11. The basic constitution of the case 11 is the same as that of the cassette case disclosed in U.S. Pat. No. 4,627,534 and shown in FIG. 2. The case 11 includes a body 15 and a lid 12 pivotally coupled to the body and having a pocket 14 and a recess 18a which is provided in the covering portion 13 of the lid and which faces the obverse or reverse side of the cassette. The thick portion 21 of the cassette 20 in which the front opening of the cassette is formed is accommodated in the recess 18a. The covering portion 16 of the body 15 of the case 11, which faces the reverse or obverse side of the cassette 20, has a recess 18b in which the thick portion 21 of the cassette is accommodated, and a pair of rotation-preventing projections 7 on which the reel shaft insertion holes 22 of the cassette are fitted. The recesses 18a and 18b are provided inside the cassette case 11 at positions so as to face each other, and are trapezoidally shaped to accommodate the thick portion 21 of the cassette 20. Projections 1 are provided on the bottoms of the recesses 18a and 18b of the lid 12 and the body 15. The tops of the projections are aventurine surfaces. The projections 1 can be shaped as characters indicative of the commercial name of the cassette, for example. The thick portion 21 of the cassette 20 is located in contact with the projections 1 of the case 11, as a result of which the relatively high frictional force between the thick portion and the aventurine tops of the projections suppresses movement of the cassette to some extent, and prevents strong mutual rubbing of the front edges 21a of the thick portion and the case at the peripheral portions 18c and 18d of the recesses 18a and 18b. As a result, chipping dust due to a rubbing action, which would cling to the tape, is prevented. Since the cassette 20 is prevented from coming into strong contact with the case 11 at the recesses 18a and 18b where the thickness of the lid 12 and the body 15 is smaller than in other parts, the case is not only protected from cracking but also prevented from being scratched in the recesses. Therefore, the appearance of the case 11 is maintained good for a long period of time.

Although the projections 1 are provided on the bottoms of both of the recesses 18a and 18b in the above-described embodiment, the present invention is not confined to this arrangement. For example, the projections may be provided only on the bottom of the recess 18b of the body 15 because the body is often located under the lid 12, and also an index card or the like, which is bent on the covering portion 13, is inserted into the lid 12 at the time of the storage of the cassette in the case, pushing the cassette away from the lid toward the body and producing a sufficient effect through the action of the projections only on the body. The projections 1 may be shaped in the form of any desired geometrical pattern, characters, or the like, so far as at least the tops of the projections are aventurine surfaces of a high coefficient of friction.

Figure 1:
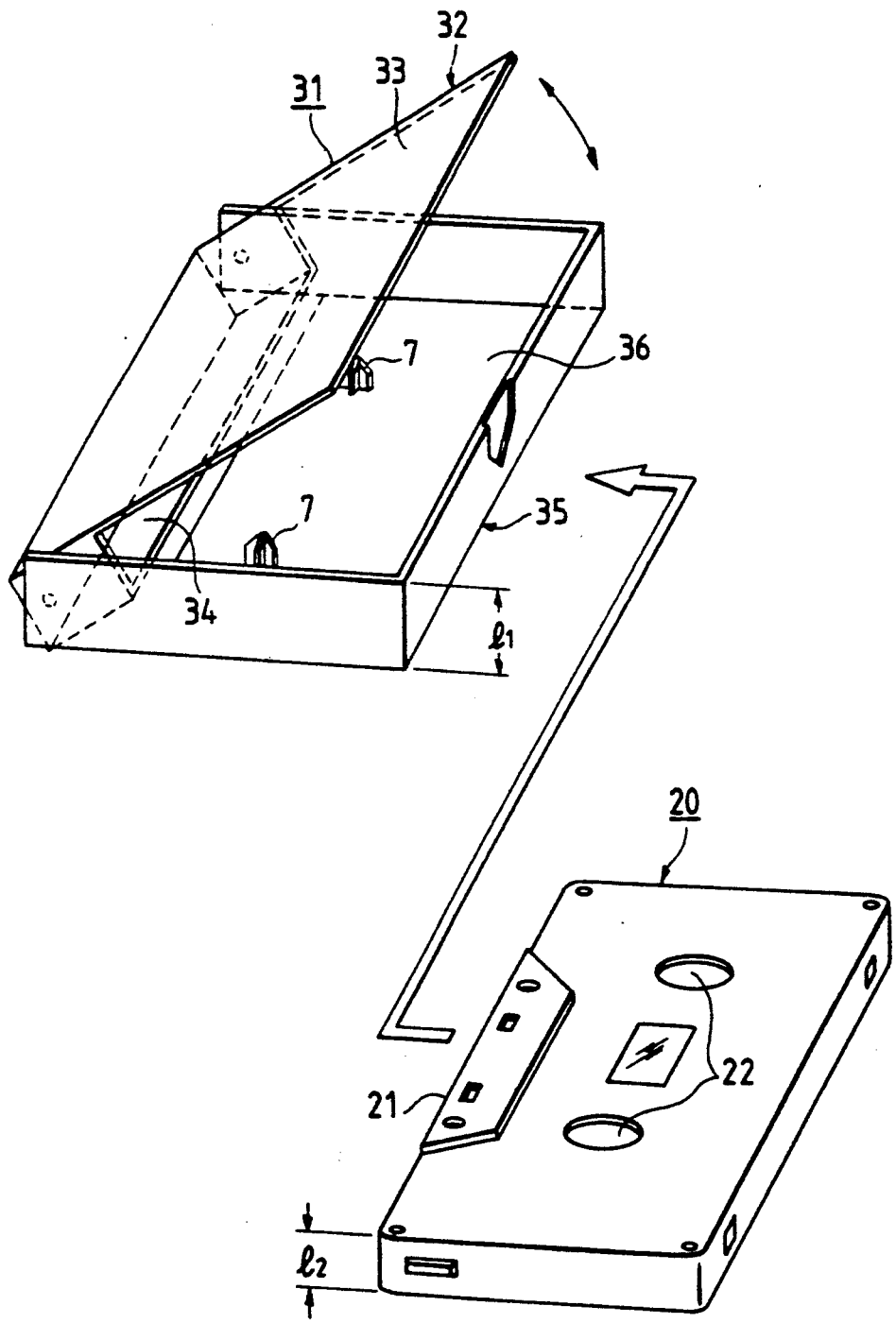
FIGS. 1 and 2 are perspective view of conventional cassette cases.
Figure 2:
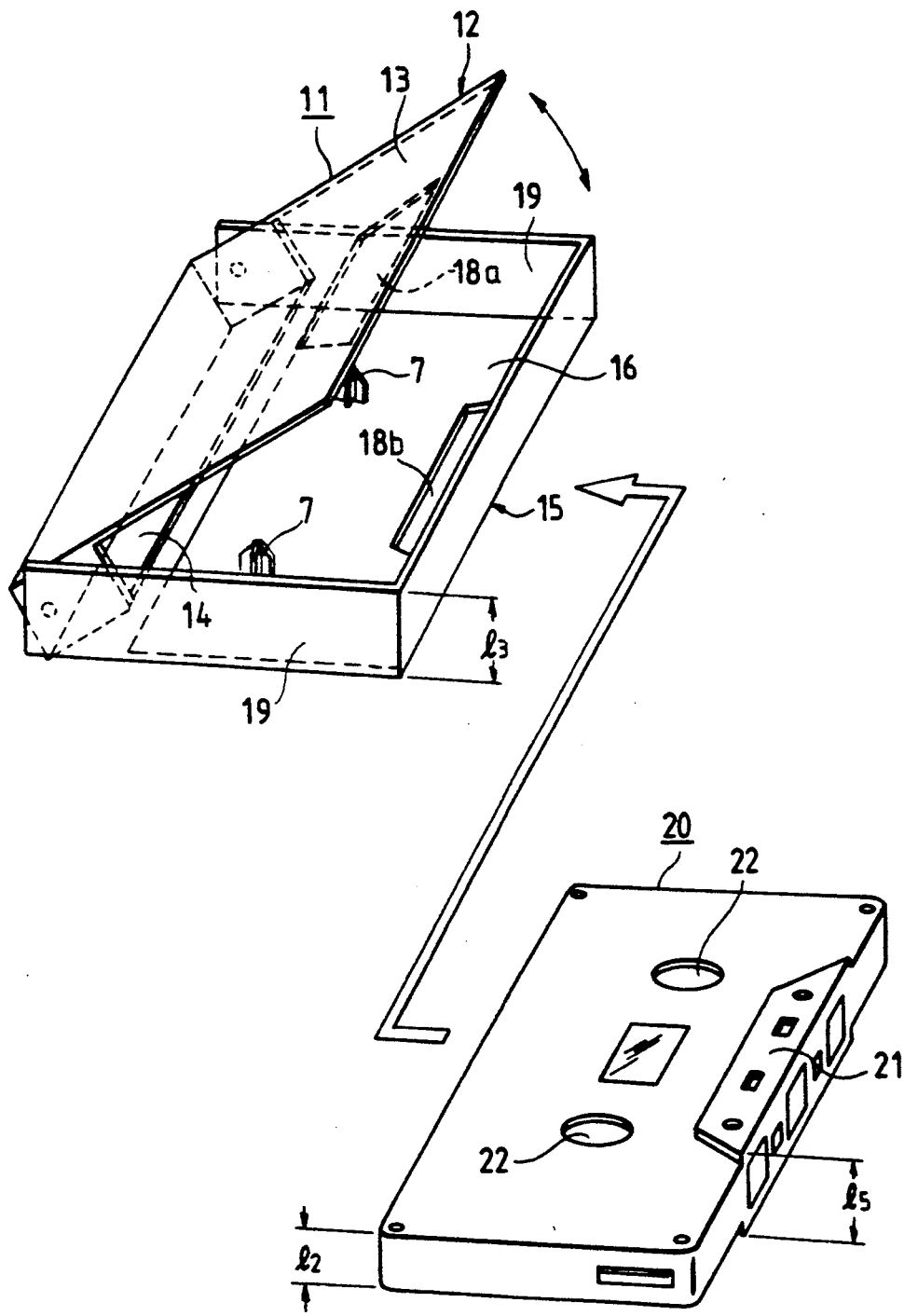
Figure 3:
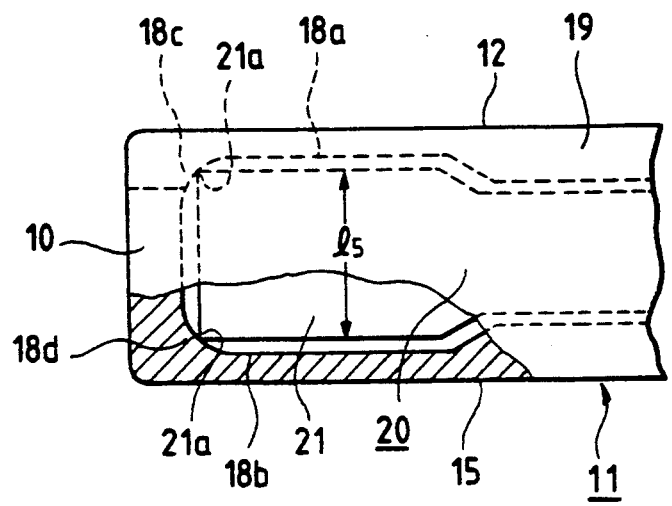
FIG. 3 is a partial sectional view of the cassette case shown in FIG. 2 accommodating a cassette.
Figure 4:
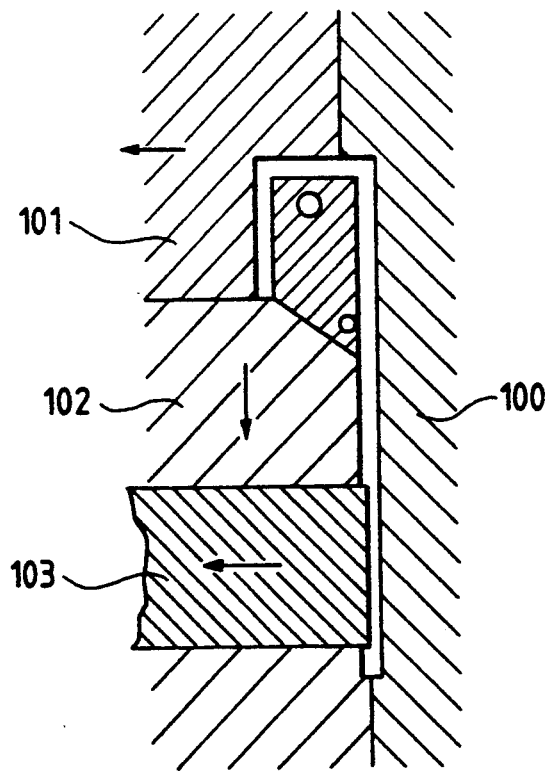
FIG. 4 is a sectional view of dies for molding the lid of the cassette case shown in FIG. 2.
Figure 7:
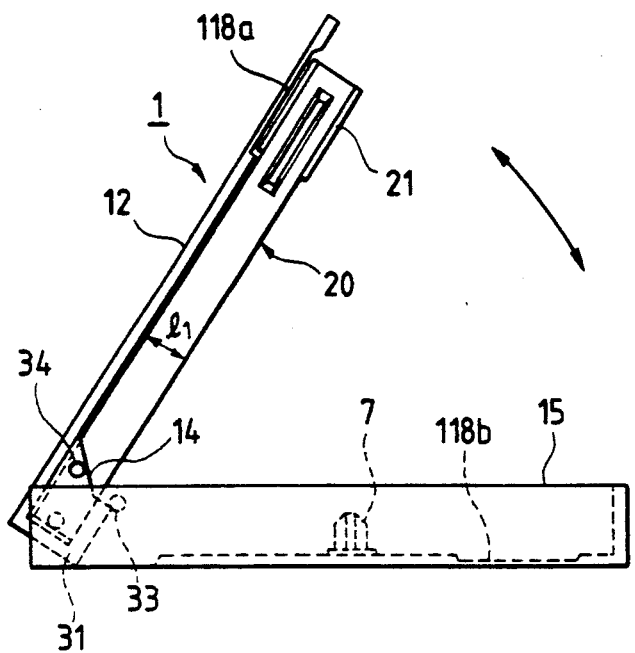
FIG. 7 is a side view of a cassette case which is another embodiment of the present invention.

FIG. 7 is a side view of a second embodiment of a cassette case 1 in the open state where the case accommodates a magnetic tape cassette 20. The basic constitution of the cassette case 1 is the same as that of the cassette case shown in FIG. 2. The cassette case 1 shown in FIG. 7 includes a lid 12 having a pocket 14 of such size as to be capable of accommodating the cassette 20 when the cassette is inserted into the pocket in the reverse direction to the cassette in the conventional cassette case shown in FIG. 1, and a body 15 having a pair of rotation-preventing projections 7 on which the shaft insertion holes 22 of the cassette are fitted. Pins 31 projecting from the insides of the right and left portions of the body 15 are fitted in through-holes provided in the right and left portions of the lid 12 as shown in FIG. 2, so that the body and the lid are pivotally coupled to each other. The cassette case 1 has hollows 34 and projections 33 so that when the lid 12 is closed, the projections are fitted in the hollows to prevent the lid from unexpectedly opening from the body while the cassette is accommodated in the case 1. The insides of the covering portions 13 and 16 of the lid 12 and the body 15, which face the obverse and reverse sides of the cassette 20, have recesses 118a and 118b facing one another in which the thick portion 210 of the cassette is accommodated. The recesses 118a and 118b have depths and forms such that the cassette 20 can be accommodated in the recesses. The distance between the covering portions 13 and 16 except in the recesses 118a and 118b is just slightly larger than the thickness $l_1$ of the cassette 20 except in the thick portion 21 thereof.

Figure 8:
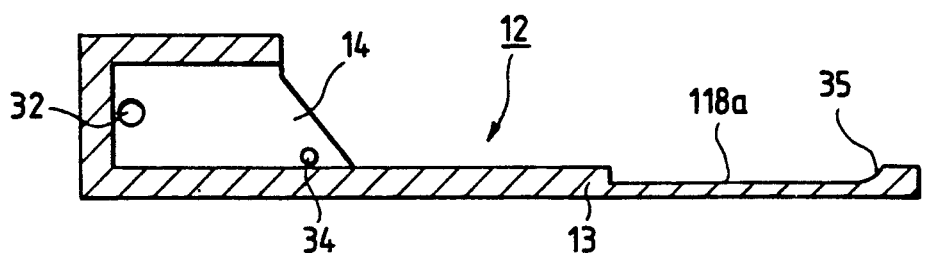
FIG. 8 is a sectional view of the lid of the cassette case shown in FIG. 7.

FIG. 8 is an enlarged sectional view of the lid 12 taken along an imaginary center line extending in the front-to-rear direction of the cassette case 1. The bottom of at least the peripheral portion 35 of the recess 118a of the lid 12 near the front edge thereof is smoothly curved so that the bottom slopes up to the front portion of the lid and the depth of the recess changes gradually at the peripheral portion thereof. For this reason, the lid 12 can be easily manufactured by injection molding without having to separate a die therefrom in an overstraining manner.

Figure 9:
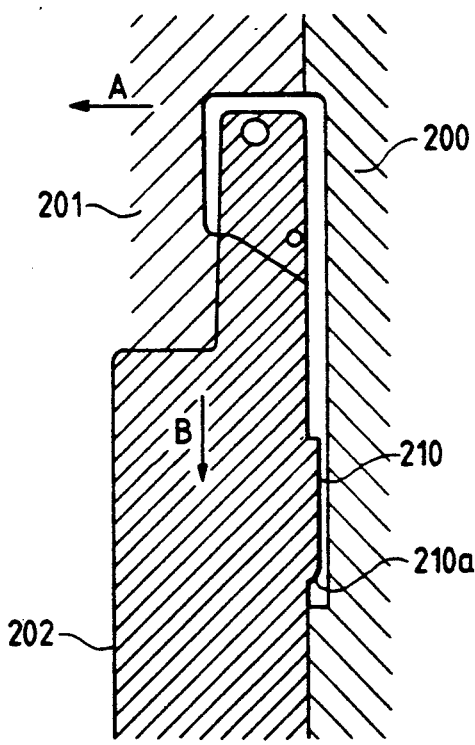
FIG. 9 is a partial sectional view of dies for molding the lid of the cassette case shown in FIG. 7.

The injection molding of the lid 12 will now be described with reference to FIG. 9. The lid 12 is molded through the use of a fixed die 200 and two movable dies 201 and 202. The movable die 202 has a projection 210 for forming the recess 118a of the lid 12. The peripheral portion 210a of the projection 210, which corresponds to the peripheral portion 35 of the recess 118a of the lid 12 near the front edge thereof, slopes with an appropriate curvature so that the height of the projection changes gradually. After a molten plastic resin has been filled into the molding cavity defined by the dies 200, 201 and 202 and then appropriately solidified, the movable dies 201 and 202 are moved away from the fixed die 200 in directions A and B. The lid 12 is thus molded. When the movable dies 201 and 202 are moved away from the fixed die 200, the movable die 202 having the projection 210 for forming the recess 118a is slid along the partially solidified covering portion 13 of the lid 12 so that the projection is separated from the lid without engaging or catching in the peripheral portion 35 of the recess 118a thereof because the peripheral portion slopes in a manner corresponding to the slope 210a of the projection in the direction of the movement of the movable die. Therefore, the movable die 202 can be smoothly separated from the lid 12. For this reason, the movable die 202 does not need to be provided with a slide core for forming the recess 118a. As a result, the movable die 202 is not only uncomplicated, but also the process of molding of the lid 12 is simplified.

Since the peripheral portion 35 of the recess 118a slopes, the thick portion 21 of the cassette 20 is prevented from engaging or catching in the recess when the cassette is pulled out from the lid 12. The throughholes 32 of the right and left portions of the lid 12 at the pocket 14 thereof and the opening preventing hollows 33 of these portions are formed through the use of slide cores which are moved perpendicular to the direction of movement of the movable die 202. The body 15 is molded through the use of a fixed die and a movable die in the same manner as the cassette case shown in FIG. 2.

Although the bottom of the peripheral portion 35 of the recess 118a is curved in the above-described embodiment, the present invention is not confined thereto, for example, the bottom may have a straight slope.

As mentioned above, the lid and body of the cassette case shown in FIGS. 5 and 6 are pivotally coupled to each other so that the lid and the body can be opened from and closed relative to each other. The lid and the body have recesses in which the thick portion of the cassette is accommodated. Projections are provided on the bottoms of the recesses extending up from the bottoms, and the tops of the projections are provided with aventurine surfaces. Since the thick portion of the cassette is accommodated in the recesses, the thickness of the cassette case can be reduced. Also, since the cassette is located in contact with the projections, the cassette is prevented from moving in the case. For that reason, the edges around the recesses and the front edges of the thick portion of the cassette are prevented from strongly rubbing against each other, thus preventing the production of chipping dust as in the cassette case shown in FIG. 2. Therefore, the problem of chipping dust clinging to the magnetic tape in the cassette is avoided. Since the cassette is prevented from coming into strong contact with the case, the case is not only protected from cracking but also prevented from being scratched in the recesses. Therefore, the appearance of the case is maintained good for a long period of time.

As mentioned above, the bottom of the peripheral portion of the recess of the lid of the cassette case shown in FIGS. 7 and 8 slopes at least near the front edge of the lid so that the depth of the peripheral portion of the recess changes gradually. For this reason, when the movable die is moved away from the lid at the time of the molding thereof, the die is separated from the lid without engaging or catching in the recess thereof so that the separation is smooth. This makes it unnecessary to provide the movable die with a slide core for forming the recess. Therefore, the constitution of the movable die is not only uncomplicated, but also a slide core movement step is unneeded, thereby simplifying the process of molding of the lid. Since the bottom of the peripheral portion of the recess slopes at least near the front edge of the lid, the thick portion of the cassette is prevented from engaging or catching in the recess. Accordingly, the handling property of the cassette case is improved.

What is claimed is:

1. In a cassette case in which a lid having a pocket and a body having rotation-preventing projections are pivotally coupled to each other so that said lid and said body can be opened and closed relative to each other, and recesses, in which a thick portion of a cassette at the front opening thereof is accommodated, are provided in said lid and said body at openable portions thereof, the improvement wherein projections are provided on the bottom of said recess of at least said body, said projections extending up from said bottom in the direction of the thickness of said case; and at least the tops of said projections are aventurine surfaces.

2. The cassette case of claim 1, wherein said projections are provided in both said recesses.

3. The cassette case of claim 1, wherein said projections are arranged in the shape of predetermined characters.

* * * * *